W. K. STAFFORD.
NUT LOCK.
APPLICATION FILED MAR. 14, 1916.

1,269,972.

Patented June 18, 1918.

Inventor,
Walter K. Stafford;
By
A. B. Upham
Attorney

UNITED STATES PATENT OFFICE.

WALTER K. STAFFORD, OF NEWTON, MASSACHUSETTS.

NUT-LOCK.

1,269,972.

Specification of Letters Patent.     Patented June 18, 1918.

Application filed March 14, 1916. Serial No. 84,096.

*To all whom it may concern:*

Be it known that I, WALTER K. STAFFORD, a citizen of the United States, and a resident of Newton, in the county of Middlesex and Commonwealth of Massachusetts, have invented certain new and useful Improvements in Nut-Locks, of which the following is a full, clear, and exact specification.

The object of this invention is the construction of an improved device for preventing the accidental unloosening of nuts; and it comprises a washer having inwardly projecting spurs and one or more outwardly reaching fingers so disposed as to enable the washer to be immovably fastened to the bolt and the nut locked from turning by the washer. Although I do not claim to be the first one to produce a nut lock having inward and outward projections, I maintain that the device I have invented possesses certain important advantages which peculiarly fit it for the purpose set forth.

Figure 1:
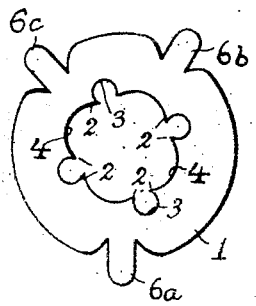
Figure 2:
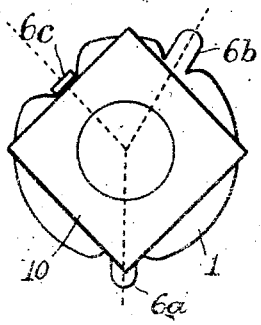
Figure 3:
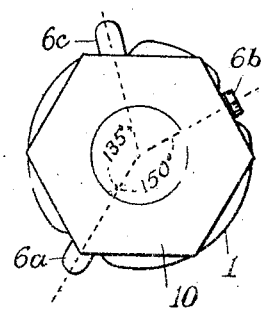
Figure 4:
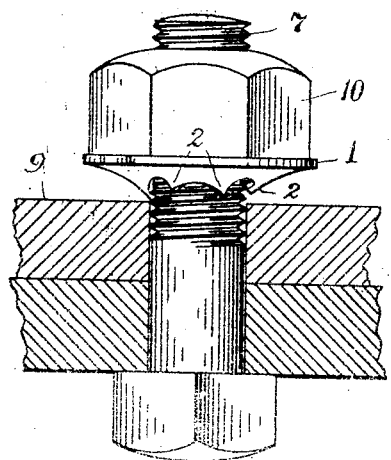
Figure 5:
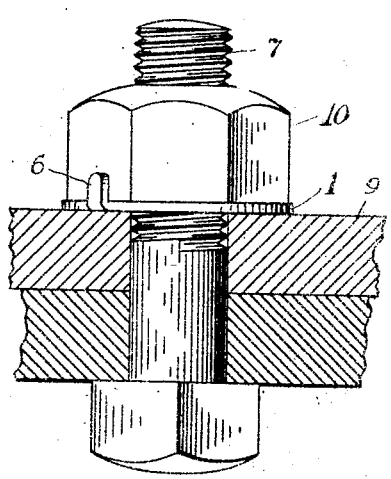
Figure 6:
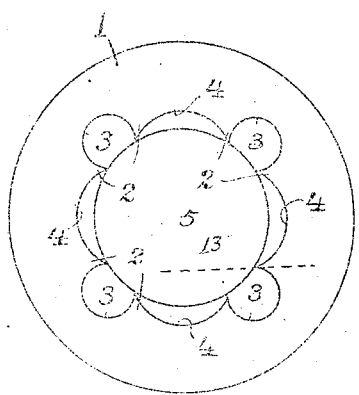
Figure 7:
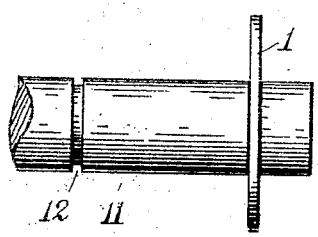

Referring to the drawings forming part of this specification, Figure 1 is a plan view of the nut lock embodying my improvements. Fig. 2 is a similar view showing a square nut locked from turning by the device. Fig. 3 is a similar view showing a hexagonal nut locked thereby. Fig. 4 is a side view of a bolt and nut having the nut lock in the process of being applied. Fig. 5 is a side view of the bolt and nut with the nut lock in its final locking condition. Fig. 6 is a plan view of the nut lock engaging a cylindrical surface. Fig. 7 is a view of a shaft or the like having the nut lock connected therewith to form a shoulder.

As shown most clearly in Fig. 6, the washer 1 is formed with several spurs 2 on its inner periphery, each spur being adapted to cut into a cylindrical body rotated past it in one direction, such direction for one spur being opposite to the direction for the next adjacent spur. Such a construction of the spurs is obtained by cutting their edges on lines which are the arcs of circles of considerably smaller radii than is the cylinder above referred to, the circle at one edge of each spur being not more than half the diameter of the circle at the other edge. For example, the smaller circle 3 has a diameter of not far from one-third of the radius of the outer periphery of the washer, while the circles 4 have a diameter about twice that of the circles 3: the centers of the circles 3 being about as far from the center of the washer as the outermost parts of the arcs 4.

By thus constructing the spurs, they are disposed to reach, not toward the center of the washer, but toward a point corresponding closely to the center of the adjacent circle 3. This gives each spur an oblique instead of a radial engagement with the spherical body 5, so that when the latter is given a forced rotation relative to the washer, some spurs tend to embed themselves into such body in whichever direction the cylinder is turned. A radial direction on the part of the spurs would, on the other hand, simply scrape the surface of the cylinder instead of thus cutting into the same.

In addition to the above described construction of the spurs 2, the latter and the remainder of the washer are given a conical contour as viewed from the edge, as indicated in Fig. 4. Such contour is not uniform, however, but is steeper for certain thereof than for each spur next thereto, as shown in Fig. 4, where it is seen that one spur reaches to the space between threads separated by a thread from the space reached by the next spur. The object of this is to keep the spurs from being pressed into the edges of the bolt-threads and thereby damaging the latter, as would be inevitably the case were the two spurs equidistant from the plane of the washer-edge. Moreover, the curve joining each adjacent pair of spurs must be of a sufficiently short radius, or in other words, deep enough, to avoid contacting with and crushing the sharp edge of the thread-section straddled by the said spurs. This is accomplished by making the arcs 3 and 4 of substantially the radial lengths above recited.

On the outer edge of the washer or nut lock are formed one or more fingers 6, preferably three, as shown in Fig. 1, by means of which to lock the nut to the washer.

The nut lock is used as follows: The diametrical distances between the spurs being slightly greater than the diameter of the bolt for which the same is designed, the washer or nut lock is slipped over such bolt 7 with its spurs toward the body 9 from which the bolt projects. The nut 10 is then turned on and screwed firmly against the washer until the latter is flattened between the nut and body 9, as shown in Fig. 5, and the spurs are forced into strong engagement with the bolt, cutting into the spaces between its threads, and thereby gripping the bolt with a firmness absolutely insuring the washer from turning thereon.

One of the fingers 6 is turned up against a surface of the nut, as also shown in Fig. 5, to lock the latter from unscrewing, and the nut lock's function is accomplished. It frequently happens a finger 6 would, if bent up, meet a corner of the nut and thereby fail to lock the latter against turning. To obviate this, I provide three fingers spaced at different relative angles, so that if one finger is at a corner of the nut, one of the others will come against the face of the nut. For example, in Fig. 2, which shows a square nut, the finger $6^a$ comes at a corner, the finger $6^b$ comes about midway between a corner and the mid-length of a flat face, while the finger $6^c$ comes against the mid length of another flat face and can be bent up against it in a manner to securely lock the nut against unscrewing. In the case of the hexagonal nut shown in Fig. 3, the fingers $6^a$ and $6^c$ are both out of position for locking purposes, while the finger $6^b$ is now in proper engagement.

In each form of nut, when the finger $6^a$ is at a corner, one of the other fingers is in exact position for proper engagement with a flat face of the nut. This is accomplished by having the angle between the fingers $6^a$ and $6^b$ 150°, and the angle between the fingers $6^a$ and $6^c$, 135°.

If the nut is positioned so that neither of the two fingers $6^b$ and $6^c$ are at the mid-length of a flat face, but a corner is midway between them, then both of said fingers are bent up to engage such corner and lock the nut in position. Likewise the fingers $6^a$ and either $6^b$ or $6^c$ may be the ones located to engage a corner of the nut midway between them.

Whatever the condition of the nut, the three fingers irregularly disposed as described always provide a means for locking the nut against movement, whereas a washer formed with oppositely arranged fingers will seldom find itself in a condition for properly locking the nut.

The same washer is well adapted for composing a shoulder upon a rod or shaft, as 11 in Fig. 7. The washer 1 may be made to settle its spurs in a groove 12, or into the body of the shaft itself, but in either case the washer must be flattened both in order to engage its spurs in the shaft and to form the shoulder or collar desired.

By having the curves 3 and 4 above described, made as arcs of circles I find it to be much easier and more economical to make the punches and dies for the manufacture of the nut lock, and the repair and renewal of the dies. When I speak of the spurs 2 being oblique, I mean that the median line or the approximate line of bisection of the sharp angle composing the edges of each spur is not radial in direction, but lies at an oblique angle with respect to a radial line to the point of the spur. This is indicated in Fig. 6, where the dotted line 13 shows the median line of a spur.

What I claim is:

1. A nut lock comprising a washer having inwardly projecting spurs, the spurs being formed with curves of a comparatively short radius, each spur having one edge formed by a segment of a circle whose diameter is slightly shorter than that of the bolt for which the nut lock is designed, and the other formed by a segment of a circle considerably smaller in diameter than the other but whose center is outside the periphery of said bolt, whereby every two adjacent spurs are oppositely directed to present themselves to the bolt in a partially tangential direction.

2. A nut lock comprising a washer having inwardly projecting spurs formed at their edges with curves of comparatively short radius, the washer and spurs being given a conical contour, and each alternate spur being more sharply conical than the adjacent spurs.

In testimony that I claim the foregoing invention, I have hereunto set my hand this 11th day of March, 1916.

WALTER K. STAFFORD.

Witness:
A. B. UPHAM.